United States Patent

[11] 3,628,975

| [72] | Inventor | Joe Van Pool<br>Bartlesville, Okla. |
| --- | --- | --- |
| [21] | Appl. No. | 857,278 |
| [22] | Filed | Aug. 25, 1969 |
| [45] | Patented | Dec. 21, 1971 |
| [73] | Assignee | Philips Petroleum Company<br>Continuation-in-part of application Ser. No. 528,915, Feb. 21, 1966, now abandoned. This application Aug. 25, 1969, Ser. No. 857,278 |

[54] POLYMERIZED DECANT OIL AND ASPHALT PRODUCT CONTAINING THE SAME
9 Claims, 1 Drawing Fig.

[52] U.S. Cl. .................................. 106/279,
208/44, 260/671, 260/683.4
[51] Int. Cl. ...................................... C08h 13/00,
C08h 17/22, C08j 1/46
[50] Field of Search ........................ 106/273–285;
208/6, 22, 44, 40, 133; 260/671,
683.4, 683.4 F, 683.41

[56] References Cited
UNITED STATES PATENTS

| 2,067,264 | 1/1937 | Ebberts ...................... | 208/6 |
| --- | --- | --- | --- |
| 2,434,000 | 1/1948 | Matuszak .................... | 260/683.41 |
| 2,494,867 | 1/1950 | Frey ............................ | 260/683.41 |
| 2,542,927 | 2/1951 | Kelly ........................... | 260/671 X |
| 2,575,718 | 11/1951 | Lee et al. .................... | 208/1 |
| 2,653,980 | 9/1953 | Condon ....................... | 260/271 |
| 2,772,316 | 11/1956 | Schneider.................... | 106/285 |
| 2,775,530 | 12/1956 | Gagle et al................... | 106/280 |
| 2,815,393 | 12/1957 | Brooke......................... | 260/671 X |
| 2,855,449 | 10/1958 | Owen .......................... | 260/671 X |
| 3,204,011 | 8/1965 | Hettick et al. ............... | 260/671 X |

Primary Examiner—Julius Frome
Assistant Examiner—Joan B. Evans
Attorney—Young and Quigg ABSTRACT: Decant oil produced in a catalytic cracking operation is combined with an HF acid soluble oil and polymerized to produce an additive for low-resin asphalts.

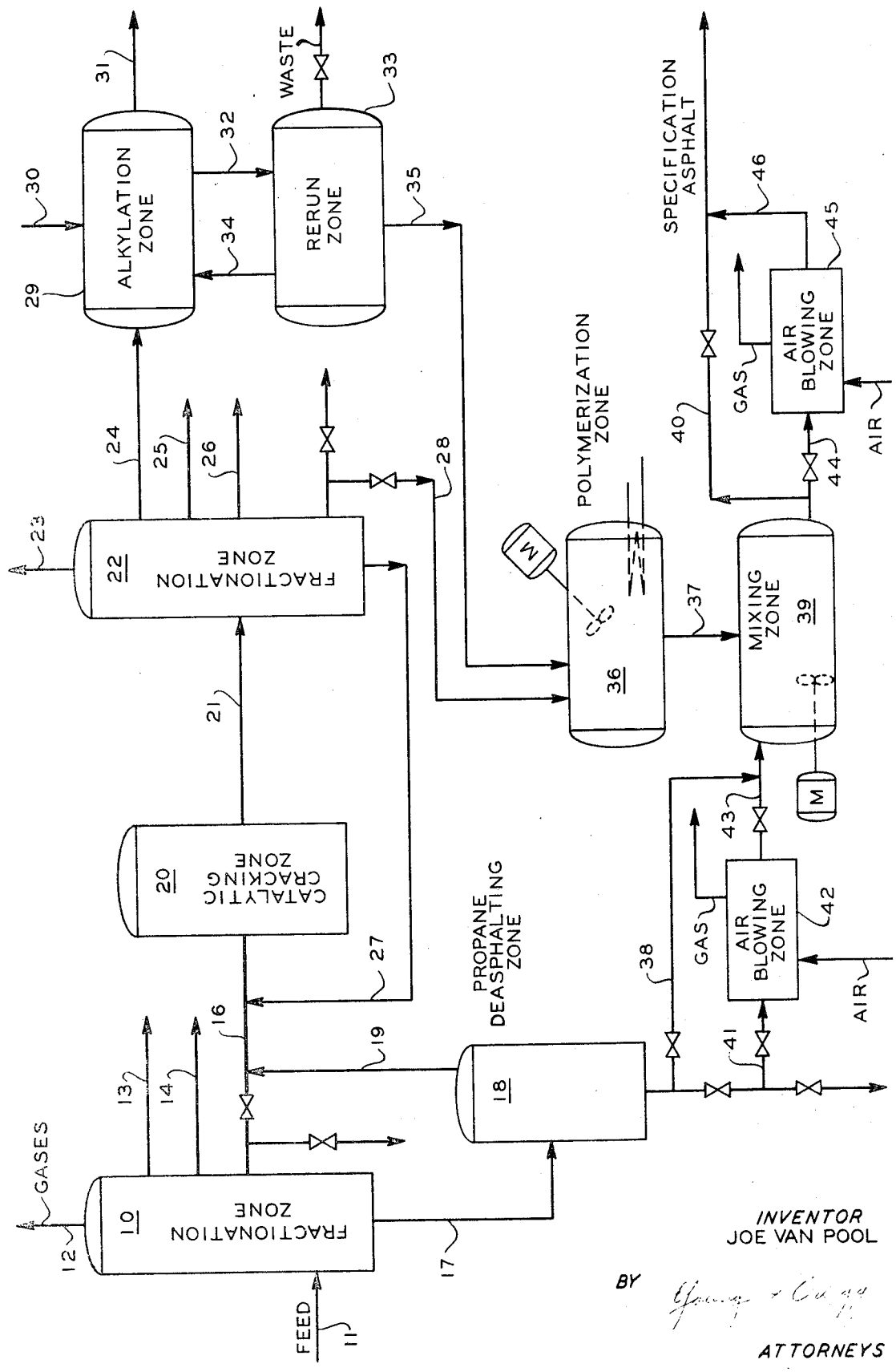

POLYMERIZED DECANT OIL AND ASPHALT PRODUCT CONTAINING THE SAME

RELATED INVENTIONS

This application is a continuation-in-part application of my copending application having Ser. No. 528,915, field Feb. 21, 1966, now abandoned.

BACKGROUND OF THE INVENTION

This invention relates to a process for polymerizing decant oil, and to a composition containing the resultant polymer. In one aspect, it relates to a method of polymerizing decant oil by contacting it with acid soluble oil. In another aspect, it relates to a method of using low grade decant oil by polymerizing it in contact with HF acid soluble oil to form a polymer. In another aspect, it relates to a method of using a decant oil from catalytic cracking process by contacting it with the HF acid soluble oil obtained from an alkylation process to form a polymer. In another aspect, it relates to a method of forming a polymer suitable for use in upgrading asphalt compositions by contacting a decant oil with an HF acid soluble oil under polymerization conditions. In still another aspect, ti related to an asphalt composition comprising asphalt and a polymer formed from decant oil and acid soluble oil.

One of the less valuable products formed in catalytic cracking of petroleum products is know as "decant secant oil." This decant oil is the heavy oil which is removed from catalytic cracking units separated, along with the catalyst, from the more valuable lighter constituents of the cracking effluent. The decant oil is subsequently separated from the catalyst by allowing the catalyst to physically separate by gravity or centrifugation from the oil. Such oils are generally of quite low value. In the process of may invention, however, I increase the value of these oils by forming polymers of them, which polymers are suitable for further use as will be described.

Additionally, I have found a way to use the HF acid soluble oils which are a byproduct of various HF catalyzed reactions. These oils are also of relatively low value, and by the process of my invention, I utilize them in upgrading other materials.

Many asphalts, in order to be suitable for various uses, e.g., as asphalt cements, must be treated to give them certain properties, such as capacity for elongation or stretching, otherwise known as ductility, and hardness or plasticity, commonly known as penetration. Generally, a combination for blending of asphalts with other asphalts or similar products, and/or blowing of the asphalt are used to bring the asphalt or asphalt cement within specified values for ductility and penetration. It has been found that with certain low resinous asphalts the various known procedures for improving their properties will not bring the ductility up to the minimum specified value.

The polymers formed by the process of my invention find utility in upgrading low quality asphalt. By the process of my invention, asphalts which fail to meet various specifications because of their low resin content are blended with the polymers formed by the process of my invention to obtain asphalt compositions which will meet specification values.

It is, therefore, an object of my invention to improve out-of-specification asphalt. It is another object of my invention to utilize low value decant oil. It is another object of my invention to utilize low value HF acid soluble oil. It is a further object of my invention to form a polymer from decant oils. It is still a further object of my invention to cause polymerization of decant oils by use of HF acid soluble oils. It is still a further object of my invention to upgrade asphalts by increasing their resin contents. It is still a further object of my invention to provide improved asphalt compositions.

Other aspects, objects and the several advantages of this invention are apparent to one skilled in the art from a study of this disclosure, drawing and the appended claims.

STATEMENT OF THE INVENTION

According to my invention, low value decant oil is polymerized by contacting it under polymerization conditions with HF acid soluble oil. The polymer thus formed is then blended with low grade asphalt to improve the properties of the asphalt.

I have found that low resinous, high wax base asphalts can be brought to specified values for ductility and penetration by blending the asphalt with a polymer formed from decant oil and HF acid soluble oil.

DESCRIPTION OF THE PREFERRED EMBODIMENTS

The decant oil which is usable in the process of my invention may be broadly defined as the heavy or residue product produced from catalytically cracking a gas oil, a topped crude oil, or admixtures thereof after fractionating off the lighter materials such as heavy cycle oil, light cycle oil, cracked gasolines, and cracked gases.

A preferred source of decant oils suitable for use in the present invention is a heavy catalytic residue stock obtained from a powdered or fluid-type catalytic hydrocarbon cracking operation in which gas oil or heavier hydrocarbons, such as reduced crude, are cracked at a temperature of about 880° to 1,050° F. at a temperature of about atmosphere to 50 pounds per square inch in the presence of suitable fluidized or powdered catalysts, such as, for example, silica-alumina, silica-magnesia, Kaolin, acid-treated montmorillonite, mol sieve catalyst (which is silica-alumina catalyst admixed with molecular seive), and other well-known cracking catalysts.

Known catalytic cracking processes including fluidized bed (FCC), moving bed (TCC), and fixed bed operations can be employed. Typical feedstocks for catalytic cracking include virgin gas oils, reduced crudes, and topped crudes. These materials can vary considerably in boiling ranges and compositions, depending upon the source of crude oil, the degree of fractionation, etc.

In the fractionation of the effluent of a fluid catalytic cracking operation the bottoms product is frequently called a slurry because it contains at least a minor amount of very finely divided catalyst. This slurry is ordinarily conveyed to a settling tank and the solid catalyst is given an opportunity to settle. When the catalyst has settled it is withdrawn as a thickened slurry and is returned into the fluid catalytic cracking operation for recovery of the catalyst. The clear or relatively clear, that is, the catalyst-free or substantially catalyst-free, supernatant oil is decanted from the catalyst settlings and this decanted oil is herein called "decant" oil.

Decant oil products suitable for use in accordance with the invention and recovered as residue of distillation of catalytic cracking effluents contain at least about 15 volume percent aromatics, have an API gravity of at least 10, and initial boiling point of at least 450° F., and usually start cracking at about 800° F.

A decant oil particularly well suited for this invention is a fraction having an aromatic content of about 15 to about 50 volume percent, an API gravit at 60° F. ranging from 10 to 30, a distillation range at 760 mm. Hg with an initial boiling point ranging from 450° to 650° F., a 40 percent distilled range at 650° to 800° F.

A typical decant oil produced from fixed bed catalytic (alumina-silica catalyst) cracking of virgin gas oil recovered from Rangely (Colorado) crude oil has an API gravity at 60° F. of about 23, and has an initial boiling point (atmospheric pressure) of about 590° to 600° F., a 5 percent point of about 700° F., a 10 percent point of about 750° F., a 40 percent point of about 790° F., and cracks at about 800° F. Such decant oil are well known in the are of catalytic cracking.

The acid soluble oil is obtained in certain processes in which hydrofluoric acid is employed as a catalyst. In hydrocarbon conversion processes in which hydrofluoric acid is employed as a catalyst, for example, alkylation and isomerization reactions, a hydrocarbon phase and an acid phase are formed. The hydrocarbon phase and acid phase are separated and hydrofluoric acid is recovered from the acid phase and is returned to the conversion system. The materials remaining after the removal of the hydrofluoric acid from the acid phase comprise a composition known as "HF acid soluble oil." The formation of acid soluble oils seems to be a characteristic of all hydrocarbon conversions in which HF is employed as catalyst, whether the primary reaction be one of alkylation, isomerization or olefin polymerization, It is not known exactly what materials make up the acid soluble oil. The acid soluble oil contains fluoro-hydrocarbon compounds and is, however, highly unsaturated, high in aromatic content, and upon evaporation of the more volatile fractions leaves a solid resin. See pages 13, 27 and 184 of "Hydrofluoric Acid Alkylation," Phillips Petroleum Company (1946), for details on the acid soluble oil and its recovery.

In the case of a typical commercial process for the alkylation of isoparaffins with olefins, the charge to the alkylation reactor comprises an isoparaffin stream, for example, a stream which is predominantly isobutane, and an olefin stream containing, for example, butylenes, with or without other olefins such as propylene and amylenes. The primary product is an alkylate suitable for use in making aviation gasoline. In the case of aromatic alkylation, the charge to the reactor may contain benzene, toluene or other aromatic hydrocarbon, and an olefin the exact nature of which depends upon the product desired. Thus, if long chain alkyl aromatics are being produced for subsequent sulfonation to form synthetic detergents, the olefin stream may comprise $C_{10}$ to $C_{16}$ monoolefins. In either case, however, the charge to the HF alkylation process is substantially free from diolefinic compounds. The formation of acid soluble oils seems to be a characteristic of all hydrocarbon conversions in which HF is employed as a catalyst, whether the primary reaction be one of alkylation, isomerization or olefin poylmerization.

A typical HF acid soluble oil, recovered from used HF catalyst, used in the alkylation of isobutane with butylenes has the following properties:

| | |
|---|---|
| API gravity at 60° F. | 16.4 |
| Flashpoint, ° F. | 230+ |
| Pour point, ° F. | 80 |
| Viscosity at 210° F., SUS | 292 |
| Fluorine, wt.% | 2.3 |
| Sulfur, wt.% | 1.2 |
| ASTM Distillation % distilled), ° F. | |
| First Drop | 220 |
| 10% | 546 |
| 20% | 584 |
| 40% | 618 |
| 60% | 635 |
| 70% (starts to crack) | 640 |

Such HF acid soluble oils are well known in the art.

I have discovered that when such acid soluble oil, which contains varying types of organic fluorides, as well as a very small amount of HF, is contacted with the decant oil, polymerization of the decant oil will take place under certain condition. Contacting of these materials at atmospheric pressure or above and at a temperature of between 150° and 400° F. will cause polymerization to occur. When the polymer is to be used for upgrading asphalt, the preferred temperature range for polymerization is 175° to 250° F., using decant oil and HF acid soluble oil at a volume ration of 1:10 to 10:1. The time of contacting will be from 100 minutes to 40 minutes. The polymers thus formed can have a rather wide range of properties depending upon the starting materials, amounts of each used, and and the actual conditions of the reaction. HOwever, properties of the polymers will generally be in the ranges as shown below.

HF ASO-Decant Oil Polymer

| | |
|---|---|
| Consistency | resinous to brittle |
| Condition(ambient temp.) | heavy tacky liquid to solid |
| Color | dark brown to black |
| Melting Point, ° F. | room temperature to 140 |

The polymers formed in the process of my invention find their utility in upgrading of asphalt.

By asphalt I mean a species of bitumen and pyrogenous substances of dark color, variable hardness, comparatively nonvolatile; composed principally of hydrocarbons substantially free from oxygenated bodies; containing relatively little or no crystallizable paraffins; and including mineral matter, the nonmineral constituents being fusible, and largely soluble in carbon disulfide, yielding water-insoluble sulfonation products. This definition applies to native asphalts and pyrogenous asphalts. Native asphalts include asphalts occurring naturally in a pure or fairly pure state and also asphalts associated naturally with a substantial proportion of mineral matter, for example, sand, sandstone, limestone, clay, shale, etc. Pyrogenous asphalts include residues obtained from the distillation, blowing, etc., of petroleum, for example: residual oils, such as are produced by steam distillation of asphaltic petroleum, dry or steam distillation of semiasphaltic petroleum or dry distillation of nonasphaltic petroleum; blown asphalts, such as are produced by blowing air through heated residual oils; residual asphalts, such as are produced by steam distillation of semiasphaltic and asphaltic petroleum; sludge asphalts, such as are produced from the acid sludge obtained in the purification of petroleum distillates with sulfuric acid; cut back asphalts, etc.

The asphalts to which the invention is applicable include all low resinous base crude residues. Examples of residues or residuums which are low in resinous materials and high in waxy components include residues produced from the following types of crude oils: Rangely (Colorado) crude; Bowes' Dome (Montana); Red Wash (Colorado-Wyoming); Santa Maria (California); etc.

These residuums or asphalts are recovered from their crude oils by, for example, vacuum flashing and/or solvent deasphalting using, e.g., liquid propane and/or liquid butane, or the like, in the deasphalting operation.

The amount of waxy components in these crude oils ranges in the order of from about 0.5 to 10 weight percent. The amount of resinous materials is difficult to determine, except that an insufficient amount of resinous material in the final asphalt product prevents the asphalt from passing both the ASTM Ductility Test (ASTM D113) and the ASTM Penetration Test (ASTM D5). See the Petroleum Refiner, Feb. 1952, page 139, relating to resins. The resins quantity is usually present in the range of 1 to 10 weight percent.

Blending of the asphalt with the polymers formed from the decant oil and the acid soluble oil may be conducted at any convenient temperature which is sufficiently high to soften the materials for blending purposes. Depending upon the properties desired, the blend may contain from 1 to 50 percent by weight of the polymer. Normally, an amount of between 2 percent and 10 percent of polymer will be sufficient to bring most asphalts within the desired specification ranges. The upgraded asphalt may be used as is, or may be further modified by oxidation through air blowing to further change the properties, as is known in the art. Additionally, polymer could be added to the asphalt after oxidizing instead of before oxidizing.

Referring now to the drawing, my invention may be seen in an integrated flow stream from a single hydrocarbon feed. The crude oil feed stream is introduced into atmospheric distillation zone 10 through line 11. Light gases are taken overhead through line 12 and include isobutane used in the subsequent alkylation process. Gasoline is removed through line 13. Distillate is removed through line 14, and virgin gas oil is removed through line 16 for charge to subsequent catalytic cracking. Topped crude is recovered as bottoms product through line 17 and is charged to asphalt recovery zone 18. A particularly desired method for recovering asphalt from topped crude is known to the art as propane deasphalting. Although the invention utilized propane deasphalting, other deasphalting systems, known in the art, can be utilized to produce asphalt. Heavy gas oil recovered through line 19 and, preferably, is admixed with gas oil from line 16 and charged to catalytic cracking zone 20. Zone 20 can be fixed bed, moving bed, or fluidized bed catalytic cracking. The effluent from zone 20 is passed through line 21 to fractionation zone 22. From zone 22 light gases are removed through line 23, olefins (proplylene and butylenes) are removed through line 24 and are charged to subsequent HF catalytic alkylation, cracked gasoline is removed through line 25, cycle oils are removed through line 26, slurry oil (catalyst in decant oil) is removed through line 27 and recycled to zone 20, and decant oil is removed through line 28. As mentioned above, HF alkylation zone 29 has charged thereto fresh isobutane 30 and olefins 24. In zone 29 using HF catalyst alkylate is produced and recovered through line 31. A quantity of system HF acid catalyst is removed through line 32 and passed to an HF acid rerun zone 33. Regenerated acid is removed through line 34 and returned to zone 29. HF acid soluble oil is removed through line 35 and passed to polymerization zone 36 along with at least a portion of decant oil 28. Polymer is removed through line 37 and admixed with asphalt charged through line 38 in mixing zone 39. Specification asphalt is recovered through line 40. A portion of the asphalt may be passed through line 41 to air blowing zone 42 and can be introduced through line 43 alone or in admixture with asphalt from line 38 into mixing zone 39. All or a portion of the asphalt containing the polymer may be passed through line 44 to air blowing zone 45 and recovered through line 46.

EXAMPLE

An asphalt composition was prepared by the process of my invention to meet the requirements of 120–150 penetration asphalt cement. The starting asphalt used was recovered from Rangely (Colorado) topped crude oil by propane deasphalting.

Equal parts of HF acid soluble oil, produced in an HF alkylation of butylenes-propylene and isobutane, and decant oil, produced from catalytic cracking of Rangely gas oil recovered from atmospheric distillation of Rangely crude oil, were mixed and heated at about 200° F. for approximately 1 hour. The table below shows specification tests on the asphalt prior to polymer addition, the asphalt with 5 percent of unpolymerized decant oil added, and the asphalt with 5 percent of the polymerized decant oil added.

| Tests | Asphalt | 5% HF acid soluble oil | 5% raw decant in asphalt | 5% polymerized ASO+decant in asphalt | Sales specification |
|---|---|---|---|---|---|
| Ductility at 77° F. | 85 | 92 | 82 | 100+ | 100+ |
| Pen. at 77° F. | 125 | 154 | 154 | 130 | 120–150 |
| Pen. at 39.2 | 28 | | 34 | 33 | (¹) |
| Pen. ratio | 22.4 | 16.9 | 22.7 | 25.4 | 25+ |

¹ No specification.

The specification ranges which were sought are a ductility in excess of 100 and a penetration value between 120 and 150. It is thus seen that the raw asphalt was within specification on only one of the three tests for which specifications had been established. The asphalt with 5 percent of raw decant oil was out of limits on all tests. The asphalt containing 5 percent of polymerized decant oil was within specification limits for the three tests.

The capacity of an asphalt (or other bituminous material) for elongating or stretching, i.e., ductility, is determined by making a briquette of the material in a ductility mold. The ductility of the bituminous material is measured by the distance to which the briquette will elongate before breaking. The briquette is pulled apart while immersed in water, the test being made at a temperature of 25°±0.5° C. and with a speed of 5 cm. per minute (±5 percent). Three tests were taken and the average reported. The distance through which the slips, attached to the bituminous material, have been pulled to produce a rupture is measured in centimeters. See ASTM D113 for the "Ductility Test" used herein.

The hardness or plasticity, i.e., penetration value, is determined by the use of a penetrometer. Penetration is defined as the consistency of a bituminous material expressed as the distance that a standard needle vertically penetrates a sample of the material under known conditions of loading, time, and temperature, using a total of 100 g., 5 seconds, and 25° C., respectively. See ASTM D5 for the "Penetration Test" used herein.

I claim:

1. A process for forming a polymer comprising reacting (a) a decant oil having an aromatic content of 15 to 50 volume percent, an API gravity at off F. of 10 to 30, cracked and an initial boiling point at 760 mm. Hg above about 450° F. and which cracks at about 800° F. obtained as a byproduct in catalytic cracking petroleum fractions with (b) an HF acid soluble oil which is highly unsaturated and high in aromatic content and contains organic fluoride and HF obtained as a byproduct from an HF catalyzed process for alkylation of olefins with paraffins or aromatics, said reacting being conducted at an elevated temperature between 150° and 400° F. and for a period of time sufficient to polymerize said decant oil and said HF acid soluble oil and from said polymer, the volume ratio of decant oil to HF acid soluble oil during said reacting being from 10/1 to 1/10.

2. The polymer formed by the process of claim 1.

3. A process according to claim 1 wherein said decant oil is the heavy residue product obtained from catalytic cracking a gas oil, a topped crude oil, or admixtures thereof after fractionating off the lighter materials including heavy cycle oil, light cycle oil, cracked gasolines, and cracked gases.

4. A process according to claim 1 wherein the alkylation process is alkylation of an isoparaffin with an olefin.

5. The process of claim 1 wherein said HF acid soluble oil is obtained from the alkylation of isobutane with a butylenes-propylene mixture; and said decant oil is the heavy residue product obtained from catalytic cracking a gas oil, a topped crude oil, or admixtures thereof after fractionating off the lighter materials including heavy cycle oil, light cycle oil, cracked gasolines, and cracked gases.

6. An asphaltic composition having a ductility at 77° F. in excess of 100 centimeters and a penetration value at 77° F. in the range 120–150 comprising asphalt and from 1–50 percent by weight of the polymer formed by the process of claim 1.

7. The composition of claim 6 wherein the amount of said polymer present is from 2–10 weight percent.

8. The composition comprising asphalt containing about 5 weight percent of the polymer formed by the process of claim 5.

9. An air oxidized asphaltic composition according to claim 6.

* * * * *